(12) United States Patent
Merlin

(10) Patent No.: US 9,019,167 B2
(45) Date of Patent: Apr. 28, 2015

(54) TRANSCEIVING CIRCUIT FOR CONTACTLESS COMMUNICATION AND NFC DEVICE OR RFID READER/WRITER DEVICE COMPRISING SUCH A TRANSCEIVING CIRCUIT

(75) Inventor: Erich Merlin, Gratkorn (AT)

(73) Assignee: Quotainne Enterprises LLC, Wilmington, DE (US)

( * ) Notice: Subject to any disclaimer, the term of this patent is extended or adjusted under 35 U.S.C. 154(b) by 369 days.

(21) Appl. No.: 12/933,859

(22) PCT Filed: Mar. 18, 2009

(86) PCT No.: PCT/IB2009/051149
§ 371 (c)(1),
(2), (4) Date: Sep. 21, 2010

(87) PCT Pub. No.: WO2009/116001
PCT Pub. Date: Sep. 24, 2009

(65) Prior Publication Data
US 2011/0043429 A1    Feb. 24, 2011

(30) Foreign Application Priority Data

Mar. 20, 2008 (EP) .................................... 08102813

(51) Int. Cl.
*H01Q 1/50* (2006.01)
*G06K 19/07* (2006.01)
*G06K 19/077* (2006.01)

(52) U.S. Cl.
CPC ........ *G06K 19/0723* (2013.01); *G06K 19/0726* (2013.01); *G06K 19/07749* (2013.01)

(58) Field of Classification Search
CPC ....... H01Q 1/243; H01Q 1/38; H04B 1/0458; H04B 1/04
USPC .......................... 343/860, 822, 745, 861, 850
See application file for complete search history.

(56) References Cited

U.S. PATENT DOCUMENTS

| | | | |
|---|---|---|---|
| 6,771,944 B2* | 8/2004 | Harano | 455/276.1 |
| 6,784,847 B2* | 8/2004 | Ngo Bui Hung et al. | 343/745 |
| 6,903,656 B1 | 6/2005 | Lee | |
| 7,248,165 B2* | 7/2007 | Collins et al. | 340/572.1 |

(Continued)

FOREIGN PATENT DOCUMENTS

| | | |
|---|---|---|
| EP | 0 625 832 A1 | 4/1994 |
| EP | 1898342 A | 3/2008 |

(Continued)

OTHER PUBLICATIONS

International Search Report for PCT/IB2009/051149 (Mar. 18, 2009).

(Continued)

*Primary Examiner* — Dameon E Levi
*Assistant Examiner* — Collin Dawkins
(74) *Attorney, Agent, or Firm* — Michael H. Lyons

(57) ABSTRACT

A transceiving circuit (1, 1') for contactless communication comprises transmitter means (3) being adapted to generate an electromagnetic carrier signal and to modulate the carrier signal according to transmitting data, and an antenna (5) being connected to and driven by the transmitter means (3) with the modulated carrier signal. At least one impedance-matching capacitor (C1*a*) is arranged serially to the antenna (5).

15 Claims, 4 Drawing Sheets

(56) References Cited

U.S. PATENT DOCUMENTS

| | | | |
|---|---|---|---|
| 2003/0206141 A1* | 11/2003 | Alexopoulos et al. | 343/860 |
| 2006/0055541 A1* | 3/2006 | Bleckmann | 340/572.7 |
| 2006/0192007 A1* | 8/2006 | Ide | 235/451 |
| 2006/0220863 A1* | 10/2006 | Koyama | 340/572.1 |
| 2007/0164788 A1* | 7/2007 | Hiura et al. | 326/62 |
| 2007/0273606 A1* | 11/2007 | Mak et al. | 343/876 |
| 2007/0296593 A1 | 12/2007 | Hall et al. | |
| 2008/0030419 A1* | 2/2008 | Sjoblom | 343/853 |
| 2008/0224935 A1* | 9/2008 | Kato | 343/749 |
| 2011/0014883 A1* | 1/2011 | Raggam et al. | 455/91 |

FOREIGN PATENT DOCUMENTS

| | | | | |
|---|---|---|---|---|
| JP | 2006-140842 | | 6/2006 | |
| KR | 20070022395 | * | 2/2007 | H04B 5/02 |
| WO | WO 2006006103 A1 | * | 1/2006 | G06K 19/07 |
| WO | 2006/054070 A1 | | 5/2006 | |
| WO | 2007/066267 A2 | | 6/2007 | |
| WO | WO 2007119310 A1 | * | 10/2007 | H01Q 1/50 |

OTHER PUBLICATIONS

"PN511 Transmission Module Rev. 3.3" NXP, 22 pgs retrieved from the internet at: www.zlgmcu.com/download/downs.asp?ID=2372 (Jun. 13, 2007).

* cited by examiner

US 9,019,167 B2

TRANSCEIVING CIRCUIT FOR CONTACTLESS COMMUNICATION AND NFC DEVICE OR RFID READER/WRITER DEVICE COMPRISING SUCH A TRANSCEIVING CIRCUIT

FIELD OF THE INVENTION

The invention relates to a transceiving circuit for contactless communication comprising transmitter means being adapted to generate an electromagnetic carrier signal and to modulate the carrier signal according to transmitting data, and an antenna being connected to and driven by the transmitter means with the modulated carrier signal.

The invention further relates to an NFC device or an RFID reader/writer device.

BACKGROUND OF THE INVENTION

FIG. 1 shows a prior art implementation of a transceiving circuit for contactless communication. This transceiving circuit employs an integrated near field communication transmission module 2, e.g. type no. PN5xx, e.g. type no. PN511 or PN512 manufactured by NXP Semiconductors, and external passive electronic components. The transmission module 2 is integrally equipped with transmitter means 3 being adapted to generate an electromagnetic carrier signal, to modulate the carrier signal according to transmitting data and to drive an antenna 5 with the modulated carrier signal, and with receiver means 4 being adapted to sense response signals being received at the antenna 5 and to demodulate the response signals. The transmission module 2 has output terminals TX1, TX2 being connectable to first and second transmitting paths wherein the transmitting paths are connected to the antenna 5 which is represented in FIG. 1 by its equivalent circuit components capacitance Cext and inductance Lext. Between the output terminals TX1, TX2 of the transmission module 2 and the external antenna 5 the following components are switched into the transmitting paths: an electromagnetic compatibility (EMC) filter comprising two inductors L0 being serially switched into the transmitting paths and two capacitors C0 being connected in parallel to the antenna 5; two DC decoupling capacitors C10 being serially switched into the transmitting paths; and an impedance-matching network 6 being arranged between a receiving path tapping A and the antenna 5, wherein the impedance-matching network 6 comprises two capacitors C2a being connected in parallel to the antenna 5 and two ohmic resistors Ra being serially switched into the transmitting paths. It should be noted that the antenna 5 is "tuned" by means of trimming the impedance-matching network 6 during manufacturing of the transceiving circuits.

Further, the receiver means 4 of the transmission module 2 comprise an input terminal RX that is connected to a receiving path that branches off from the first transmitting path at tapping A. A phase adjusting capacitor C3 is switched into the receiving path in order to enable adjusting of the phase angle of signals between the first transmission path and the receiving path. By adjusting the phase angle an optimal demodulation can be achieved. Further, an ohmic resistor R1 is serially switched into the receiving path. With this resistor R1 the voltage level appearing at the input terminal RX of the receiver means 4 can be adjusted. Numeral VMID depicts an analog reference voltage input of the receiver means 4. A capacitor C4 is switched between the analog reference voltage input VMID and ground potential. An ohmic resistor R2 connects the input terminal RX and the analog reference voltage input VMID.

For a better understanding of the function of the RFID transmission module 2, a block diagram of the near field communication (NFC) transmission module type no. PN511 is shown in FIG. 2. The NFC transmission module 2 comprises analog circuitry which can be roughly divided into transmitter means 3 and receiver means 4. Although not shown, the analog circuitry comprises output drivers, an integrated demodulator, a bit decoder, a mode detector and an RF-level detector. A contactless UART communicates with the analog circuitry via a bus. The contactless UART comprises data processing means, CRC/Parity generation and checking means, frame generation and checking means, and bit coding and decoding means. The UART further communicates with a microprocessor, comprising a 80C51 core, ROM and RAM. A host interface enables to connect the transmission module to external devices. The host interface may comprise I2C, serial UART, SPI and/or USB interfaces. Further details of the transmission module can be looked up in the respective data sheets which are publicly available.

One of the most important field of application of near field communication (NFC) transmission modules are mobile phones. Mobile phones equipped with NFC transmission modules can be used for ticketing, access control systems, payment services, etc. Usually, the NFC transmission modules are powered by the hosting mobile phone.

A severe disadvantage of this known transceiving circuit is that due to the chosen manner of antenna tuning the current consumption of the near field communication (NFC) transmission module can vary in such a large range that it even drifts out of the specifications. This variation of current consumption is based on a detuning effected which occurs when an antenna 11 of an NFC card or tag (or generally speaking of a resonant circuit 10) is brought in varying proximity to the antenna 5 of the transceiving circuit as shown in the schematic arrangement of FIG. 3. In this arrangement the antenna 5 of the transceiving circuit is positioned in the center of a Cartesian coordinate system (x,y,z) and the antenna 11 of the resonant circuit 10 is moved along the z-axis. The distance n between the antenna 5 of the transceiving circuit and the antenna 11 of the resonant circuit 10 is normalized. Varying the distance in z-axis direction between the antenna 5 and the antenna 11 of the resonant circuit 10 results in varying detuning of the antenna 5 of the transceiving circuit, the consequences of which can be seen in the graph of FIG. 4. The graph of FIG. 4 depicts the current consumption I(z) of the transceiving circuit in dependence on the distance in z-axis. A horizontal line represents the specified maximal current consumption Imax. It will be appreciated that for distances between the antenna 5 and the antenna 11 smaller than the value 1 the current consumption of the transceiving circuit exceeds the specified maximal current consumption Imax and is therefore not acceptable for practical implementations. It should be mentioned that the highest coupling between the antenna 5 and the antenna 11 is reached when their mutual distance is zero. This problem of this prior art antenna matching cannot even be solved by increasing the matching impedance to considerably higher values (e.g. from values of between 35 and 60 Ohms which are usually chosen to a value of 100 Ohms). Therefore there is still a strong need for a transceiving circuit for contactless communication that allows the circuit to be operated within the current consumption limits given by the specification. Particularly, such a transceiving circuit should be able to be operated in the whole range of reading distance from zero to the maximum reading distance.

OBJECT AND SUMMARY OF THE INVENTION

It is an object of the invention to provide a transceiving circuit for contactless communication of the type defined in the opening paragraph and an NFC device in which the disadvantages defined above are avoided.

In order to achieve the object defined above, with a transceiving circuit according to the invention characteristic features are provided so that a transceiving circuit according to the invention can be characterized in the way defined below, that is:

A transceiving circuit for contactless communication comprising:

transmitter means being adapted to generate an electromagnetic carrier signal and to modulate the carrier signal according to transmitting data, an antenna being connected to and driven by the transmitter means with the modulated carrier signal, wherein at least one impedance-matching capacitor is arranged serially to the antenna.

The characteristic features according to the invention provide the advantage that the circuit can be operated throughout the entire range of distance between the antenna of the circuit and an antenna of a resonant circuit like an NFC card or tag without consuming more current than allowed by the specifications. Specifically, such a transceiving circuit is able to fulfil all specifications of the standard ISO 14443. Particularly the transceiving circuit according to the present invention remains below the maximal allowable current consumption even when the reading distance to the antenna of the resonant circuit becomes zero, and although at distances close to zero the resonant circuit implies a strong detuning effect on the antenna of the transceiving circuit.

Highly stable and constant values of the absolute values of the matching-impedance MZ of the transceiving circuit is achieved irrespective of a varying distance of the antenna to a resonant circuit like an NFC card when the at least one impedance-matching capacitor is arranged in a transmission path between the antenna and a tapping of a receiving path from the transmission path and/or when the at least one impedance-matching capacitor is arranged in a transmission path between the antenna and an electromagnetic compatibility filter which is connected to output terminals of the transmitter means.

In an embodiment of the invention the antenna comprises split antenna parts and the impedance-matching capacitor is arranged between antenna parts. This embodiment provides the advantage that since the impedance-matching capacitor is located externally of the integrated transceiving circuit components it is not subject to space limitations. Particularly, the impedance-matching capacitor is arranged at the external antenna side of the circuit which offers plenty of space for arranging electronic components.

In an alternative embodiment of the invention the transceiving circuit comprises two impedance-matching capacitors, which are serially arranged in transmission paths at both sides of the antenna. This embodiment enables easy trimming of an impedance-matching network of the transceiving circuit during the manufacturing process.

The transceiving circuit according to the invention can be incorporated in an NFC device, an RFID reader/writer device or an RFID card.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 5:
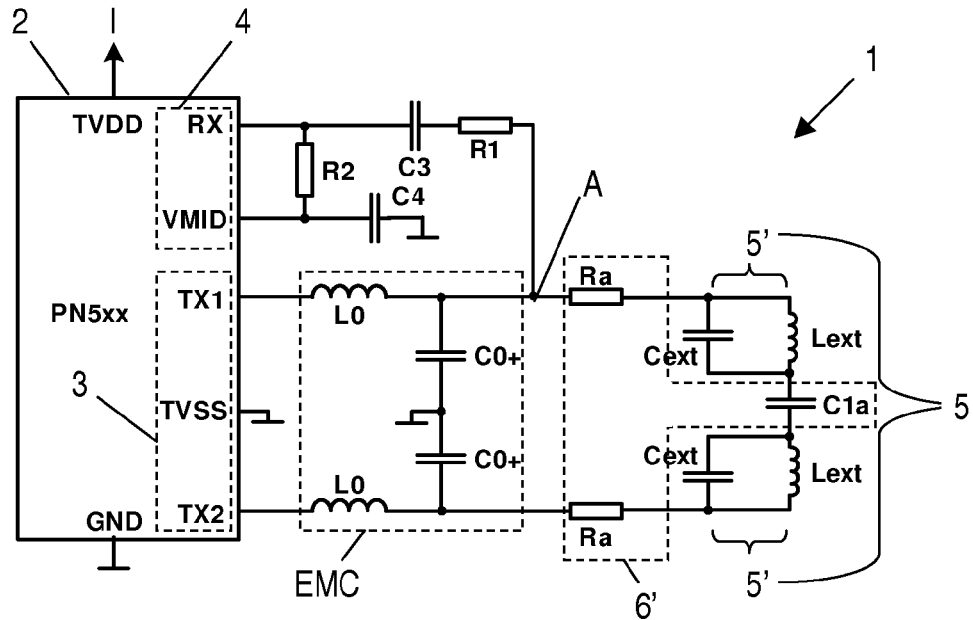
FIG. 5 shows a circuit diagram of a transceiving circuit for contactless communication according to a first embodiment of the present invention.

FIG. 5 shows a circuit diagram of a transceiving circuit 1 according to a first embodiment of the present invention. This transceiving circuit 1 comprises an integrated RFID transmission module 2, e.g. a near field communication transmission module of the type no. PN5xx manufactured by NXP Semiconductors, or of the Micore family (MF RC5xx, MF RC632, SL RC400) also manufactured by NXP Semiconductors. The transmission module 2 has a supply terminal TVDD for supplying it with electric current I. The transmission module 2 comprises transmitter means 3 and receiver means 4. The transmitter means 3 of the RFID transmission module 2 generate an electromagnetic carrier signal. The carrier signal is modulated according to transmitting data. An antenna 5 is driven with the modulated carrier signal. The transmission module 2 has output terminals TX1, TX2 being connected to first and second transmitting paths wherein the transmitting paths are connected to the antenna 5, which is represented in FIG. 5 by its equivalent circuit components, i.e. a capacitor Cext and an inductor Lext. The total values of capacitor Cext and inductor Lext have to be determined according to the respective application. For reasons explained below the antenna 5 is designed to be split into two antenna parts 5', 5', wherein each antenna part 5', 5' is represented by a capacitor Cext and an inductor Lext.

The output terminals TX1, TX2 of the transmission module 2 are connected to an electromagnetic compatibility filter EMC that forms part of the transmitting paths and comprises two inductors L0 being serially switched into the transmitting paths and two capacitors C0 each being connected to ground and connecting on the other hand the transmitting paths, thereby being switched in parallel to the antenna 5. It should be noted that the electromagnetic compatibility filter EMC is set to have a natural frequency close to the frequency of the carrier signal of the transceiving circuit 1. For instance, if the carrier signal is 13.56 MHz (according to the standard ISO 14443) then the circuit has a second resonance frequency at approx. 14.1 MHz. This second resonance frequency causes the circuit acting as a current source and hence is necessary. However, due to the slight deviation from the frequency of the carrier signal this current source behaviour is not ideal but shows some properties of a voltage source. Nevertheless, this overall behaviour is intended, since an ideal current source would cause high overshots at the rising and falling edges of the carrier signal.

The receiver means 4 of the transmission module 2 comprise an input terminal RX that is connected to a receiving path that branches off from the first transmitting path at a tapping A, such that the electromagnetic compatibility filter EMC is arranged between the output terminals TX1, TX2 and the tapping A. A phase adjusting capacitor C3 is switched into the receiving path in order to enable adjusting of the phase angle of signals between the first transmission path and the receiving path. By adjusting the phase angle an optimal demodulation can be achieved. Further, an ohmic resistor R1 is serially switched into the receiving path. With this resistor R1 the voltage level appearing at the input terminal RX of the receiver means 4 can be adjusted. Numeral VMID depicts an analog reference voltage input of the receiver means 4. A capacitor C4 is switched between the analog reference voltage input VMID and ground potential. An ohmic resistor R2 connects the input terminal RX and the analog reference voltage input VMID. The receiver means 4 are not part of the present invention, but are known to those skilled in the art, so they do not have to be explained in greater detail.

Figure 6:
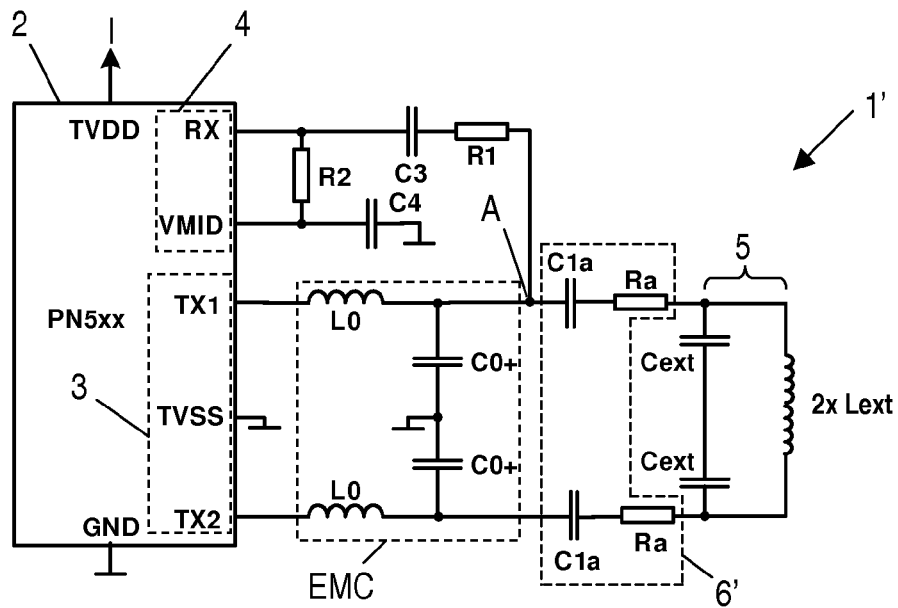
FIG. 6 shows a circuit diagram of a transceiving circuit for contactless communication according to a second embodiment of the present invention.
Figure 7:
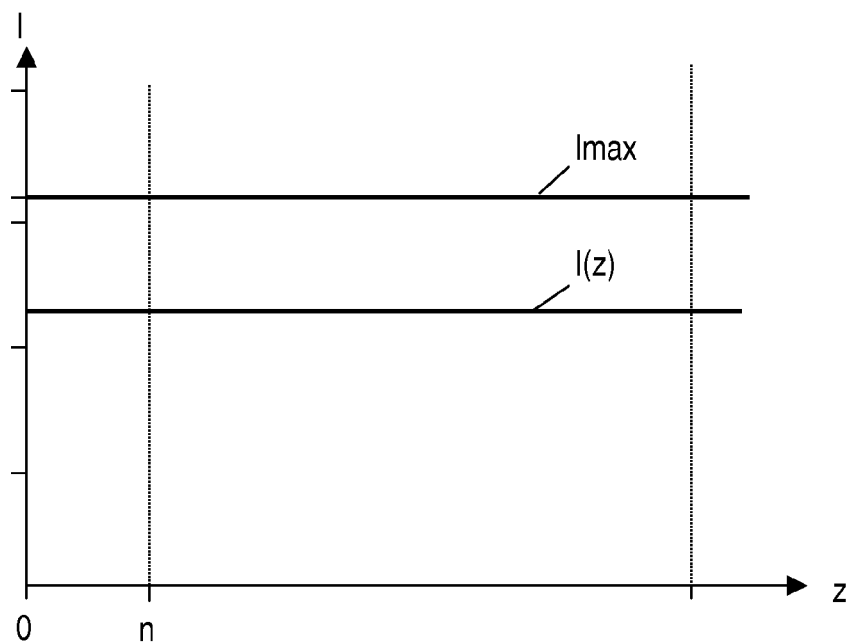
FIG. 7 shows a graph depicting the current consumption I of the transceiving circuits according to FIG. 5 or FIG. 6 in dependence on the distance to an antenna of a resonant circuit, like an NFC card or tag.

Further, an impedance-matching network 6' is arranged between the electromagnetic compatibility filter EMC and the antenna 5. As can be seen in the drawing, the impedance-matching network 6' is arranged between the receiving path tapping A and the antenna 5. It should be noted that the antenna 5 is "tuned" by means of the impedance-matching network 6' during manufacturing of the transceiving circuit 1. The impedance-matching network 6' comprises two ohmic resistors Ra being serially switched into the transmitting paths and further comprises an impedance-matching capacitor C1a arranged serially between the two antenna parts 5', 5'. This impedance-matching capacitor C1a provides the effect that when the transceiving circuit 1 is used, as e.g. shown in the arrangement according to FIG. 6, the absolute value of the matching-impedance MZ is not any longer greatly influenced by the varying distance n of the antenna 5 to an antenna 11 of a resonant circuit 10 like an NFC card, but remains stable and sufficiently constant to keep the electric load applied to the output terminals TX1 and TX2 sufficiently constant so that the current I(z) consumed by the integrated RFID transmission module 2 generally remains constant irrespective of the actual distance in z-axis between the antenna 5 of the transceiving circuit 1 and the antenna 11 of the resonant circuit 10 and is considerably lower than a predefined maximum current Imax. FIG. 7 shows a graph depicting the current consumption I(z) of the transceiving circuit 1 over the distance n in z-axis direction to antenna 11 of the resonant circuit 10. The changes of the matching-impedance MZ of the transceiving circuit 1 in dependence on the detuning effect caused by the resonant circuit 10 is shown in the Smith Chart of FIG. 8.

A particular advantage of arranging the impedance-matching capacitor C1a between the antenna parts 5', 5' is that by this arrangement the impedance-matching capacitor C1a is located externally of the integrated transceiving circuit components so that it is not subject to space limitation, since usually the external antenna side of the circuit offers plenty of space for arranging electronic components.

Figure 1:
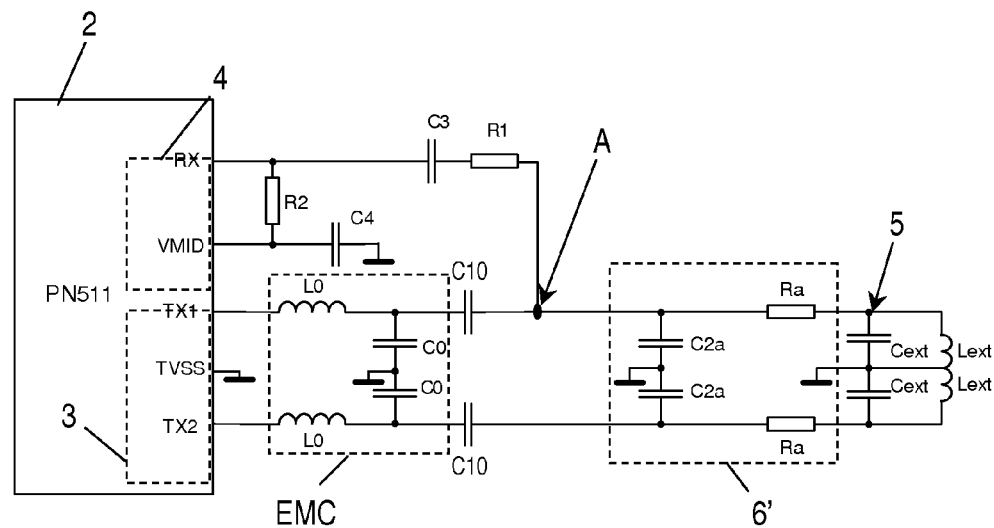
FIG. 1 shows a circuit diagram of a transceiving circuit for contactless communication according to prior art.
Figure 2:
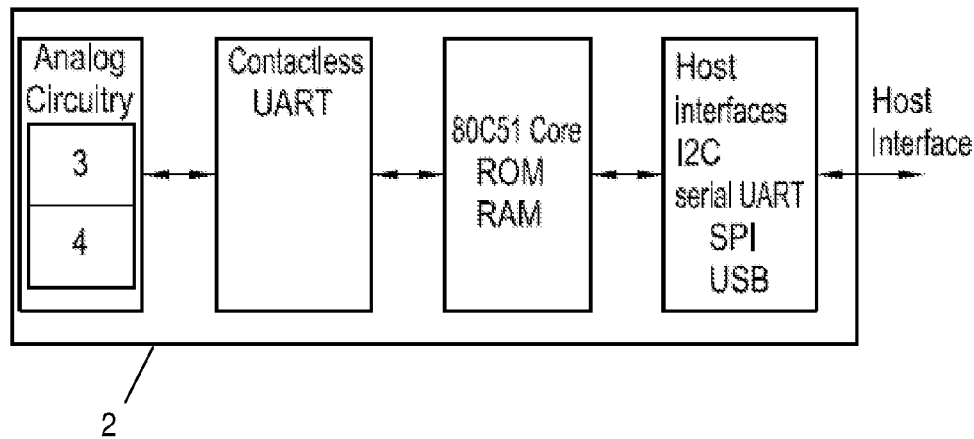
FIG. 2 shows a block diagram of a transmission module incorporated in the transceiving circuit of FIG. 1.
Figure 3:
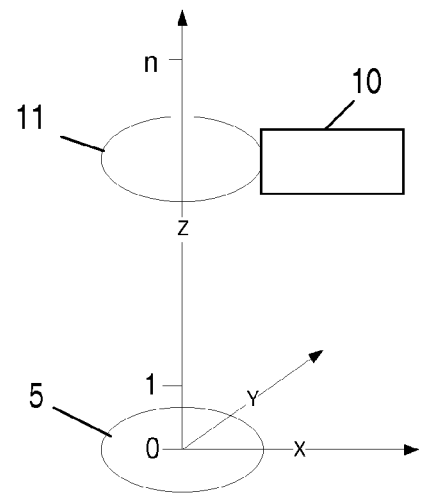
FIG. 3 shows a schematic block diagram of an arrangement of a transceiving circuit and an NFC card.
Figure 4:
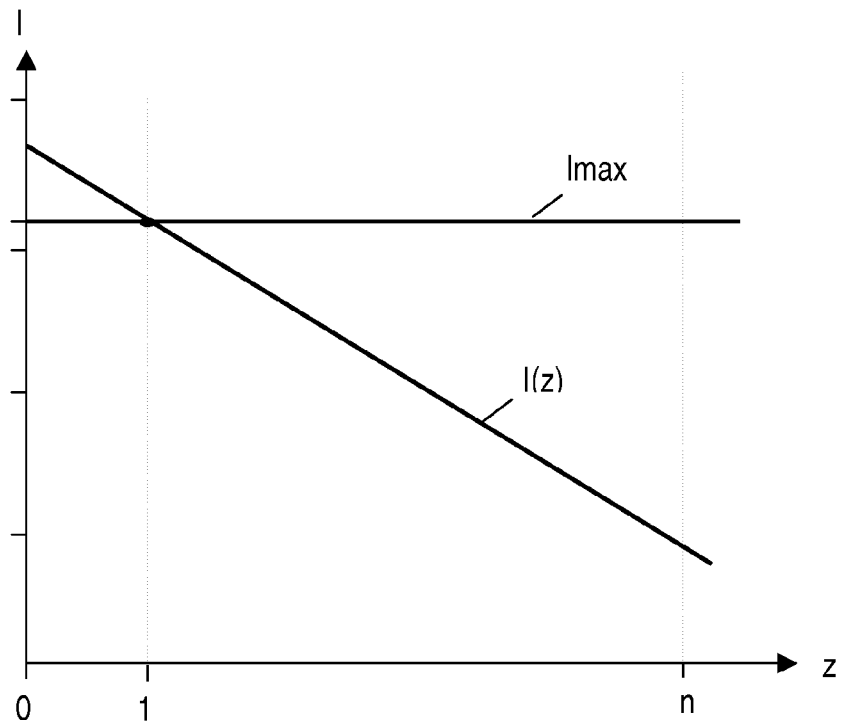
FIG. 4 shows a graph depicting the current consumption of the transceiving circuit according to FIG. 1 in dependence on the distance to an antenna of a resonant circuit, like an NFC card or tag.

The principal difference between the transceiving circuit according to the present invention compared to the prior art transceiving circuit as disclosed in FIG. 1 is that the present invention applies a parallel-serial approach wherein the impedance-matching capacitor C1a is arranged serially to the antenna 5. In contrast thereto, the prior art transceiving circuit of FIG. 1 is based on a serial-parallel approach in that on the one hand the DC decoupling capacitors C10, C10 are arranged serially to the antenna 5 and on the other hand the capacitors C2a, C2a of the impedance-matching network 6 are arranged in parallel to the antenna 5. The present invention enables to meet all timing requirements of ISO 14443.

Figure 8:
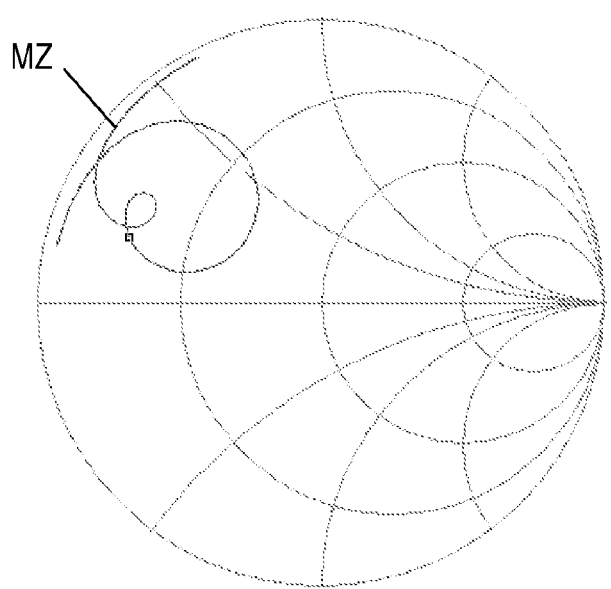
FIG. 8 shows a Smith Chart of the impedance of the transceiving circuits according to FIG. 5 or FIG. 6 in dependence on the detuning effect caused by a resonant circuit, like an NFC card or tag.

The embodiment of the transceiving circuit 1 is, however, not the only way to implement the present invention. In order to enlighten possible variations of the invention, another embodiment of a transceiving circuit 1' according to the present invention will now be explained by reference to the circuit diagram of FIG. 6. The second embodiment of a transceiving circuit 1' for contactless communication differs from the first embodiment only in that instead of an impedance-matching capacitors arranged between antenna parts there are two impedance-matching capacitors C1a, C1a provided which are arranged serially to the antenna 5. Further, there is no split antennas provided but one integrated antenna 5 represented by its equivalent circuit components capacitances Cext, Cext and inductance 2×Lext. Strictly speaking, the impedance-matching capacitors C1a, C1a are arranged between the receiving path tapping A and the antenna 5 and hence also between the electromagnetic compatibility filter EMC and the antenna 5. The impedance-matching capacitors C1a, C1a form part of the impedance-matching network 6" that also comprises the ohmic resistors Ra, Ra. The behaviour of this second embodiment of the transceiving circuit 1' is the same than that of the first embodiment. Particularly, the graphs of FIG. 7 and FIG. 8 are also applicable to this second embodiment. It should further be mentioned that the transceiving circuit 1' is useful for both symmetric and asymmetric antennas 5.

The transceiving circuits 1, 1' according to the present invention are perfectly adapted to be used in NFC devices and are particularly useful for use in NFC mobile telephones.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transceiving circuit for contactless communication comprising:
   transmitter means configured to generate an electromagnetic carrier signal and to modulate the carrier signal for transmitting data;
   an antenna, wherein the antenna is connected to the transmitter means and driven by the transmitter means using the modulated carrier signal;
   a first impedance-matching capacitor formed in a first transmission path that is coupled to a first output terminal of the transmitter means;
   a second impedance-matching capacitor formed in a second transmission path that is coupled to a second output terminal of the transmitter means;

a tapping point of a receiving path that is coupled to the first transmission path so that the tapping point is interposed between the first output terminal and the first impedance-matching capacitor;

a phase adjusting capacitor that is switched into the receiving path; and an electromagnetic compatibility filter that is connected between the first and second output terminals of the transmitter means and the first and second impedance-matching capacitors, wherein the first impedance-matching capacitor is interposed between the tapping point and the antenna, wherein the antenna comprises first and second capacitors and an inductor, wherein the first and second capacitors are connected together in series and the inductor is coupled between the first and second impedance matching capacitors in parallel with the first and second capacitors.

2. An electronic device comprising a transceiving circuit according to claim 1.

3. The transceiving circuit defined in claim 1, wherein the first output terminal of the transmitter means is coupled to a first side of the tapping point and the first impedance-matching capacitor is coupled to a second side of the tapping point that is different from the first side.

4. The transceiving circuit defined in claim 3, wherein the antenna is coupled to the second side of the tapping point through the first impedance-matching capacitor.

5. The transceiving circuit defined in claim 4, wherein the antenna is coupled to the second output terminal of the transmitter means through the second impedance-matching capacitor.

6. The transceiving circuit defined in claim 5, wherein the first impedance-matching capacitor is coupled between the tapping point and a first side of the antenna and the second impedance-matching capacitor is coupled between the second output terminal of the transmitter means and a second side of the antenna that opposes the first side of the antenna.

7. The transceiving circuit defined in claim 6, wherein the antenna comprises two capacitive elements and at least one inductive element.

8. The transceiving circuit defined in claim 1, wherein the first and second capacitors are directly connected together in series.

9. The transceiving circuit defined in claim 8, wherein the inductor is directly connected to the first and second capacitors.

10. A transceiving circuit for contactless communication comprising:

transmitter means configured to generate an electromagnetic carrier signal and to modulate the carrier signal for transmitting data; and an antenna that is connected to and driven by the transmitter means using the modulated carrier signal, wherein first and second transmission paths are connected between the antenna and corresponding first and second output terminals of the transmitter means, wherein the antenna comprises first and second inductors and an impedance matching capacitor connected in series between the first and second inductors, wherein a tapping point of a receiving path is connected to the first transmission path at a location that is between the first output terminal and the first inductor of the antenna, and wherein the second inductor is connected in series between the impedance matching capacitor and the second transmission line path.

11. The transceiving circuit defined in claim 10, wherein the first output terminal is coupled to the first inductor through the tapping point.

12. The transceiving circuit defined in claim 10, further comprising filtering circuitry coupled to the first and second transmission paths between the antenna and the transmitter means.

13. The transceiving circuit defined in claim 10, wherein the impedance matching capacitor is directly connected to the first and second inductors.

14. The transceiving circuit defined in claim 13, further comprising a first capacitor connected in parallel with the first inductor between the impedance matching capacitor and the first transmission line path, wherein the first capacitor is directly connected to the impedance matching capacitor.

15. The transceiving circuit defined in claim 14, further comprising a second capacitor connected in parallel with the second inductor between the impedance matching capacitor and the second transmission line path, wherein the second capacitor is directly connected to the impedance matching capacitor.

* * * * *